March 8, 1932.    E. M. PRESCOTT    1,848,657
UNLOADING AND ELEVATING DEVICE
Filed March 12, 1930    2 Sheets-Sheet 1

INVENTOR.
Edwin M. Prescott.
BY Townsend, Loftus & Ablett
ATTORNEYS.

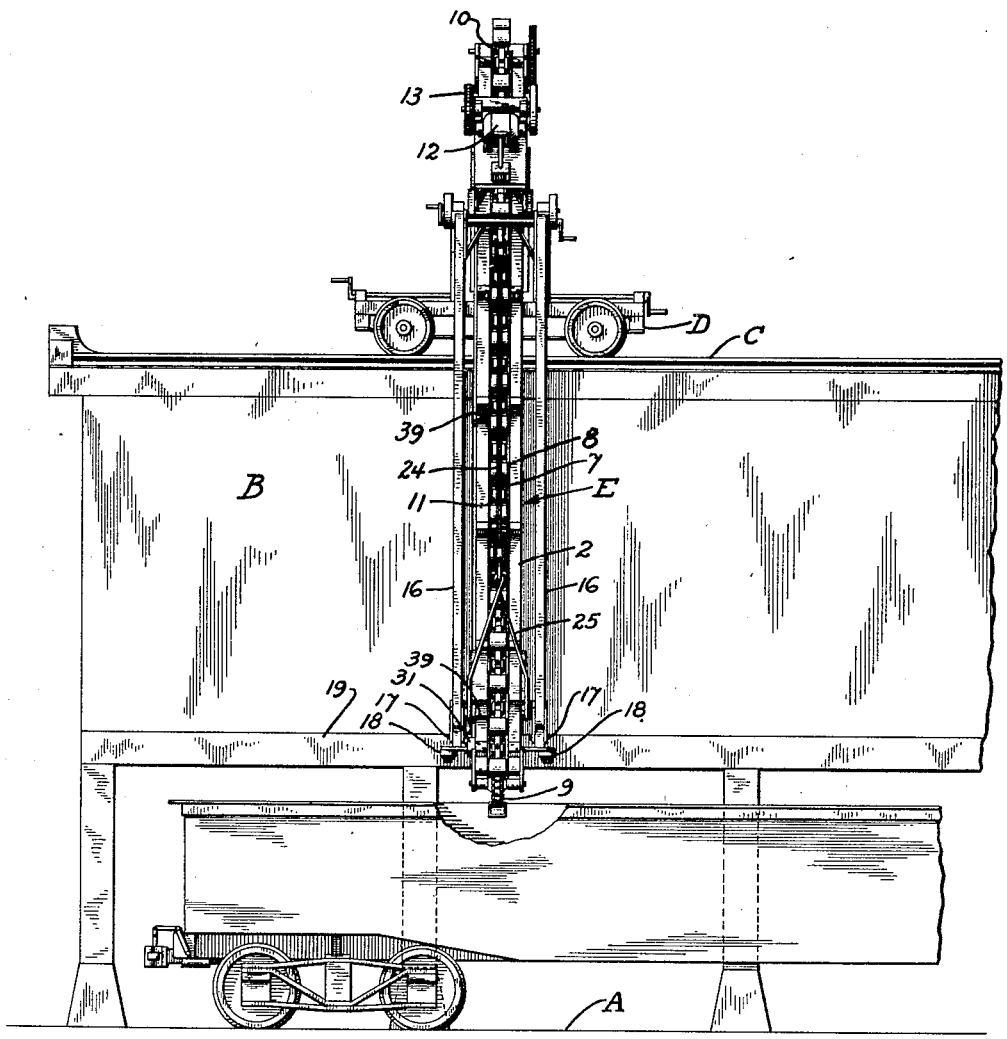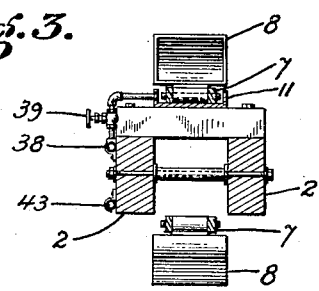

Patented Mar. 8, 1932

1,848,657

UNITED STATES PATENT OFFICE

EDWIN M. PRESCOTT, OF FRESNO, CALIFORNIA

UNLOADING AND ELEVATING DEVICE

Application filed March 12, 1930. Serial No. 435,247.

This invention relates to an unloading and elevating machine particularly adapted for unloading sand, gravel, and like material from railway cars and for elevating and discharging the material into bunkers disposed at one side of the track or railroad right of way.

The object of the present invention is to generally improve and simplify the construction and operation of machinery of the character described; to provide a combination unloading and elevating device which may be moved longitudinally of a bunker and railway car to be unloaded; to provide a combination unloading and elevating device which permits a bunker to be built parallel and comparatively close to a trackway; to provide a combination unloading and elevating device which is mounted on a carriage movable from end to end of the bunker and pivotally supported thereon to permit it to assume a vertical position against the side of the bunker when not in use or an angular extended position when a car is to be unloaded; to provide a combination unloading and elevating device employing a pivotally mounted frame, an endless bucket elevator carried by the frame and a motor on the frame to drive the bucket elevator; and further, to provide a frame which is both angularly and vertically adjustable with relation to the bunker and the car to be unloaded.

The unloading and elevating device is shown by way of illustration in the accompanying drawings, in which—

Fig. 2 is a side elevation of the bunker and the unloading and elevating device, Fig. 3 is an enlarged cross section taken on line III—III of Fig. 1.

Figure 1:
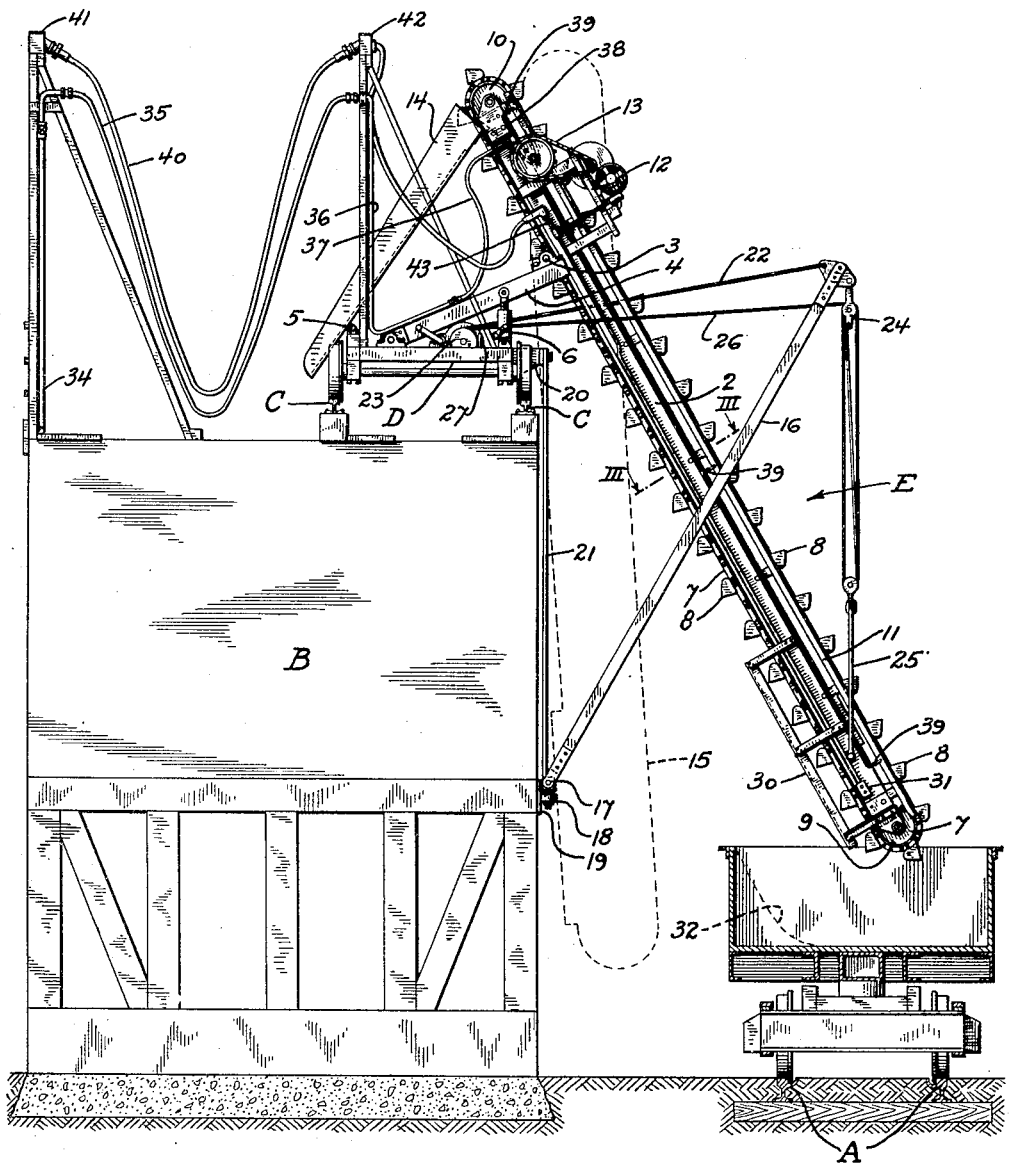
Fig. 1 is an end view of the bunker showing the unloading and elevating device.

Referring to the drawings in detail and particularly Fig. 1, A indicates a railroad trackway, and B a bunker mounted on one side thereof and parallel therewith. The bunker may be of any suitable length and may be divided into bins to receive different material. On the top of the bunker and extending from end to end thereof is a trackway such as indicated at C and supported by the trackway is a carriage D which forms a support for the unloading and elevating device generally indicated at E.

The unloading and elevating device comprises a frame 2 pivotally supported as at 3 on the outer end of an arm 4. The inner end of this arm is pivotally attached as at 5 to the carriage and a jack mechanism 6 is interposed between the carriage and the free end of the arm, this jack being hand or power operated as may prove most feasible and serving the function of raising and lowering the arm 4 together with the frame 2 in a vertical direction as will hereinafter be described. The frame 2 forms a support for an endless chain 7 carrying elevating buckets 8, the chain being supported by sprocket gears 9 and 10 journaled at opposite ends of the frame and the intermediate portion or upper run of the chain being further supported and guided by a channel section such as indicated at 11. The chain 7 together with the buckets 8 will be referred to as a bucket elevator and it is in this instance shown as driven by an electric motor 12, the drive of the motor being transmitted to the upper sprocket 10 through a reduction drive such as shown at 13, hence permitting the bucket elevator to be driven at a suitable speed. The material elevated by the buckets discharges at the upper end of the frame into a chute 14 and this in turn directs it into the bins of the bunker.

The frame 2 carrying the bucket elevator may be raised or lowered vertically as previously described through means of the jack mechanism 6 and the arm 4. It is also angularly adjustable about pivot 3 so that it may assume a vertical position as shown by dotted lines at 15 against the side of the bunker or an angular extended position such as shown in Fig. 1. In order to swing the bucket elevator outwardly to assume the angular position shown a pair of boom arms 16 are employed. These arms are pivoted as at 17 on a roller carriage 18 which follows a plate or track 19 extending from end to end of the bunker, the roller carriage being hung from the main carriage D through brackets 20 and downwardly extending rods 21. The upper end of the boom 16 is connected through a cable 22 with a hand or power operated winch 23 mounted on carriage D and by operating the winch the boom may be swung inwardly or outwardly about pivot 17. The boom carries a cable tackle generally indicated at 24. This is connected to a bridle 25 pivotally attached to the lower end of the frame and the free end of the cable indicated at 26 is attached to a winch 27 which may be power or manually operated. By operation of this winch the frame 2 is swung inwardly or outwardly with relation to the side of the bunker and a railroad car to be unloaded and as the frame is also vertically adjustable the elevator may first be swung outwardly over the car and then lowered into the same. The lower end of the frame is provided with a guard such as shown at 30 and the buckets are thus guarded against contact with the side of the car.

In actual operation the unloading device is first swung to assume the position shown in Fig. 1 and jack 6 is then actuated to lower the device down into the car. A switch generally indicated at 31 is then operated and a circuit is closed through the motor 12 thereby transmitting power to operate the bucket elevator. The buckets will in this manner dig into the sand, gravel, or whatever material is being handled and the material will be elevated and discharged into the chute 14 and from there directed into the proper bin or bins. The unloading and elevating operation is started at one end of the car and the carriage D is gradually moved longitudinally of the bunker and the car thereby permitting practically the entire contents of the car to be unloaded without shoveling the material. The elevating mechanism will leave a small amount of material in one side, the amount left being indicated by the dotted line 32. This may be shoveled out by hand into the buckets and removal of all material is thus insured.

It was previously stated that the upper run of the chain 7 and buckets 8 was supported by a channel section such as shown at 11. A certain amount of sand or like material will spill out of the buckets and deposit on the chain in the channel and a considerably frictional resistance will thus be imposed. In the present instance such resistance is practically eliminated by providing water lubrication. The water from any suitable source of supply and under pressure is delivered to the bunker through pipe 34. A hose of suitable length to permit the carriage D to move from end to end connects pipe 34 with a pipe 36 mounted on the carriage. This pipe is in turn connected through a hose 37 with a pipe 38 extending from the upper to the lower end of the frame and branch pipes connect pipe 38 with different parts of the channel, the branch pipes being best shown in Fig. 3. These pipes are valve controlled as shown at 39 and sufficient water is thus admitted to the channel to wash away the sand and thereby keep the chain clean and at the same time reducing frictional resistance to a minimum. The electric current required to operate motor 12 is delivered to a cable 40, this being connected at one end with a standard 41 on the bunker and at the opposite end to a header or standard 42 on the carriage. The cable is then connected with a conduit 43 on the frame and this extends to the motor 12 and to the switch 31. This switch is in control of the operator who is stationed in the car to be unloaded and the motor may thus be stopped and started as occasion demands. Operation of the winches 23 and 27 and the jack 6 is controlled by an operator stationed on the bunker, this operator also moving the carriage longitudinally of the bunker whenever necessary such movement being transmitted in any suitable manner for instance by a track lever or the like.

The provision of water lubrication is important as it reduces the power required to a minimum. The location of the driving motor 12 on the frame and above the bucket elevator is also important as it keeps the same free from any possible dirt and grit and at the same time functions more or less as a counter-balance to swing the frame about the pivot 3. The pivotal and vertical movement of the boom is also important as it permits it to be angularly and vertically adjusted with relation to cars of different height and side aprons, and furthermore it permits the elevating mechanism to assume the vertical dotted line position indicated at 15 thereby providing the standard track clearance required by the Interstate Commerce Commission.

The design in general allows additional bunker capacity and it permits the bunkers to be placed closer to the tracks than is usually the case. The entire mechanism employed is rigid and substantial in construction. The booms and adjusting mechanism employed is simple and easy to operate and all adjustments may accordingly be made in the minimum of time, thus permitting rapid handling and unloading of the cars disposed on the trackway.

While certain features of the present invention are more or less specifically described, I wish it understood that various changes may be resorted to within the scope of the appended claims. Similarly, that the materials and finishes of the several parts employed may be such as the manufacturer may decide, or varying conditions or uses may demand.

Having thus described my invention, what I claim and desire to secure by Letters Patent is—

1. The combination with an elongated bunker having a trackway extending from end to end thereof, of a carriage supported by the trackway and movable thereon, a pair of arms pivotally secured at their inner ends to the carriage, a substantially vertically disposed frame pivotally attached at a point spaced from the upper end to the outer ends of the arms, means for raising and lowering the arms to adjust the position of the frame vertically, a power driven elevator carried by the frame, a boom arm pivotally suspended from a point below the carriage and movable with the carriage, means connected with the free end of the boom to swing it to or away from the carriage, and a connection between the boom and the lower end of the frame whereby the frame may be swung to or away from the side of the bunker.

2. In a device of the character described, a frame, sprocket gears journaled at opposite ends of the frame, an endless chain carried and driven by the sprocket gears, a plurality of buckets secured to the chain, a channel-shaped member extending substantially from end to end of the frame and forming a guide and support for the upper reach of the chain, a pivotal support for the frame, a conduit extending substantially from end to end of the channel and communicating with the channel at a plurality of points, and a flexible connection between the conduit and a source of supply whereby water is delivered to the conduit and the channel.

3. In a device of the character described, a frame, sprocket gears journaled at opposite ends of the frame, an endless chain carried and driven by the sprocket gears, a plurality of buckets secured to the chain, a channel-shaped member extending substantially from end to end of the frame and forming a guide and support for the upper reach of the chain, means for delivering water to said channel at a plurality of points throughout its length, an electric motor supported by the frame adjacent the upper end thereof, a reduction drive connecting the motor and the uppermost sprocket gear to drive the chain and buckets, and a flexible conduit to deliver current to the motor.

4. The combination with an elongated bunker having a trackway extending lengthwise thereof, of a carriage supported by the trackway and movable thereon, an elevator frame pivotally supported with relation to the carriage, a rod extending downwardly from the carriage and alongside the bunker, a boom pivotally connected to the lower end of said rod, and a connection between said boom and said elevator frame whereby the frame may be swung to or away from the side of the bunker.

5. The combination with an elongated bunker having a trackway extending lengthwise thereof, of a carriage supported by the trackway and movable thereon, an elevator frame pivotally supported with relation to the carriage, a rod extending downwardly from the carriage and alongside the bunker, anti-friction means between the rod and the bunker, a boom pivotally connected to the lower end of said rod, and a connection between said boom and said elevator frame whereby the frame may be swung to or away from the side of the bunker.

6. In combination with an elevator of the character described comprising a frame, an endless conveyor on said frame, and a channel-shaped member in which said conveyor travels, means for delivering a fluid to said channel-shaped member at a plurality of points throughout its length.

EDWIN M. PRESCOTT.